United States Patent [19]

Cotterill

[11] Patent Number: 5,676,829
[45] Date of Patent: Oct. 14, 1997

[54] SCREEN

[75] Inventor: Andrew Mark Cotterill, Kingswinford, United Kingdom

[73] Assignee: Jones & Attwood Limited, Stourbridge, England

[21] Appl. No.: 604,307

[22] Filed: Feb. 21, 1996

[30] Foreign Application Priority Data

Feb. 21, 1995 [GB] United Kingdom ............... 9503340

[51] Int. Cl.$^6$ .................... B01D 33/04; B01D 33/46
[52] U.S. Cl. .................... 210/158; 210/159; 210/160; 210/393; 210/396; 210/400
[58] Field of Search .................... 210/160, 158, 210/159, 161, 400, 401, 392, 393, 396, 394

[56] References Cited

U.S. PATENT DOCUMENTS

| | | |
|---|---|---|
| 840,973 | 1/1907 | Todd. |
| 1,076,483 | 10/1913 | Collar. |
| 1,435,770 | 11/1922 | Welser. |
| 2,885,080 | 5/1959 | Goldman. |
| 3,225,928 | 12/1965 | Black. |
| 3,506,129 | 4/1970 | Crombie. |
| 3,976,573 | 8/1976 | Miller. |
| 4,042,507 | 8/1977 | Langemack. |
| 4,582,601 | 4/1986 | Strow. |
| 4,812,231 | 3/1989 | Wiesemann. |
| 4,892,652 | 1/1990 | Rudy et al.. |
| 5,059,313 | 10/1991 | Etschel. |
| 5,300,221 | 4/1994 | Austevoll. |
| 5,565,093 | 10/1996 | Frankenberger. |

FOREIGN PATENT DOCUMENTS

| | | |
|---|---|---|
| 0 523 821 | 1/1993 | European Pat. Off.. |
| 2 260 900 | 6/1974 | Germany. |
| 92 04 974.5 | 7/1992 | Germany. |
| 100465 | 3/1916 | United Kingdom. |
| 192333 | 5/1922 | United Kingdom. |
| WO91/17808 | 11/1991 | WIPO. |

*Primary Examiner*—Thomas M. Lithgow
*Attorney, Agent, or Firm*—Jacobson, Price, Holman & Stern, PLLC

[57] ABSTRACT

A screen assembly is described which comprises a flow channel along which sewage is intended to flow, in use, a continuous flexible belt entrained around roller or wheel means and projecting into the channel, and means for driving the belt. The belt is perforated such that relatively large solids carried along the flow channel in the sewage are trapped by the belt adhering thereto due to a pressure differential across the belt. Movement of the belt lifts such solids from the flow channel. The belt is of thickness less than or equal to 1 mm.

12 Claims, 5 Drawing Sheets

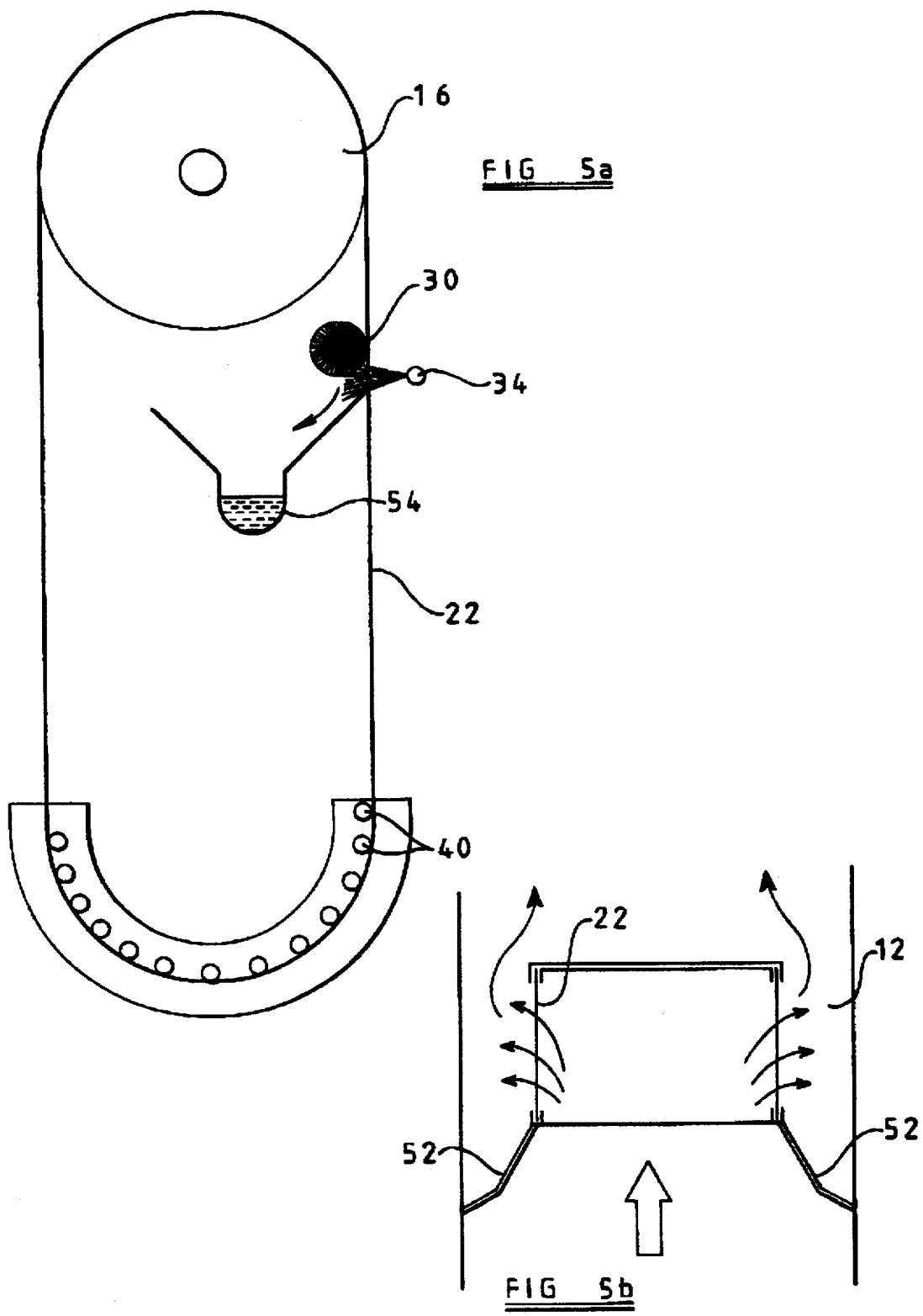

SCREEN

FIELD OF THE INVENTION

This invention relates to a screen assembly, in particular to a screen assembly suitable for use in the separation and removal of solids from a flow of raw sewage.

BACKGROUND OF THE INVENTION

The removal of solids from a flow of raw sewage is currently achieved using a screen comprising a plurality of spaced bars, the spacing being small enough to collect the solids whilst permitting the liquid phase to flow between the bars. A bar to bar spacing of 6 mm is commonly used. An alternative known screen comprises a perforated plate, the liquid phase being able to pass through the perforations. Where perforated plates are used, the plates are commonly constructed of heavy gauge carbon steel, stainless steel or a plastics material, and such fixed screens require some form of cleaning mechanism to remove, periodically, collected screenings so that the flow is not blocked.

One common design of screen known as a drum screen comprises a generally cylindrical hollow body the curved wall of which is constructed of spaced bars or perforated plates. Since the bars or plates are of relatively heavy gauge, they can only be bent through a limited radius, and hence the screen is of a relatively large diameter.

In order to reduce the dimensions of the screen, a panel screen has been designed in which individual perforated plates are mounted upon the links of a chain entrained around toothed wheels at least one of which is driven by a suitable motor. In use, the panels are moved through a generally vertical track by driving the toothed wheels to move the chain. As the plates are rigid, it will be understood that the minimum diameter of the toothed wheels, and hence the dimensions of the panel screen are still limited.

Further, it has been found that by increasing the thickness of the plates, the flow of the liquid phase through the perforations of the plates is improved and tends to carry fibres through the perforations which, with a thinner screen, otherwise tend to become caught on the plate in a manner known as 'hairpinning' thus blocking or partially blocking one or more of the perforations. A screen including such thick plates is described in WO91/17808 which teaches that for good liquid phase flow, the thickness of each plate should be greater than or equal to the perforation diameter.

SUMMARY OF THE INVENTION

According to the present invention there is provided a screen assembly comprising a flow channel along which sewage is intended to flow, in use, a continuous, flexible, perforated belt entrained around roller or wheel means and projecting into the channel, and means for driving the belt, the belt being of thickness less than or equal to 1 mm.

The use of a continuous belt is advantageous in that the dimensions of the screen can be reduced compared to the drum and panel screens and as the belt is continuous, the gaps between the plates of the panel screen are not present reducing the risk of objects becoming jammed.

It has been found that the use of a thin material for the belt improves the ease of cleaning the belt.

The belt is conveniently constructed of stainless steel. The use of stainless steel for the belt results in the belt being of sufficiently great strength to withstand the impact of solids therewith. Further, the use of a relatively thin gauge belt means that cleaning brushes are able easily to penetrate the perforations and remove material which blocks or partially blocks the perforations as a result of hairpinning.

Preferably, the means for driving the belt comprises a friction drive arrangement.

The belt preferably comprises an elongate sheet-like member the ends of which are interconnected to form a continuous loop. The interconnection of the ends of the belt is preferably flexible, and conveniently takes the form of a hinge extending across the width of the belt.

The provision of a flexible interconnection enables the interconnected ends of the belt to flex as they pass around the roller means.

Preferably, the belt is provided with forks arranged to carry objects with the belt which do not adhere thereto.

The screen assembly desirably includes means for cleaning the belt. The cleaning means may comprise means for applying washing water to the belt which may be arranged to produce a spray or jet to dislodge material from the belt. The cleaning means may additionally or alternatively comprise first brush means, conveniently in the form of a first rotatable brush.

A second, polishing brush may also be provided, the polishing brush being positioned downstream of the first brush means in the direction of movement of the belt, in use.

The belt may be oriented such that the axis of rotation of the wheel or roller means extends generally across the flow channel. Alternatively, the belt may be oriented such that the axis of rotation extends along the channel.

Additional intermediate roller means may be provided to permit a change in the direction of movement of the belt, in use.

BRIEF DESCRIPTION OF THE DRAWINGS

The invention will further be described, by way of example, with reference to the accompanying drawings, in which:

FIGS. 5a and 5b are views of a further embodiment.

DETAILED DESCRIPTION OF THE PREFERRED EMBODIMENTS

The screen assemblies illustrated in the accompanying drawings are suitable for use in a number of stages in the treatment of sewage. For example, the screen assemblies may be used as primary screens for screening sewage as it first enters a treatment works to remove, for example, tissues, polythene bags and large solids from the flow. Alternatively, the screen assemblies could be positioned after comminutors or after primary screens to act as secondary screening stations. A further possibility is to position to screen assemblies downstream of grit separation stations so that the screen assemblies screen a grit free flow. It will be recognised that there may be other stages in which the screen assemblies could be used.

Figure 1:
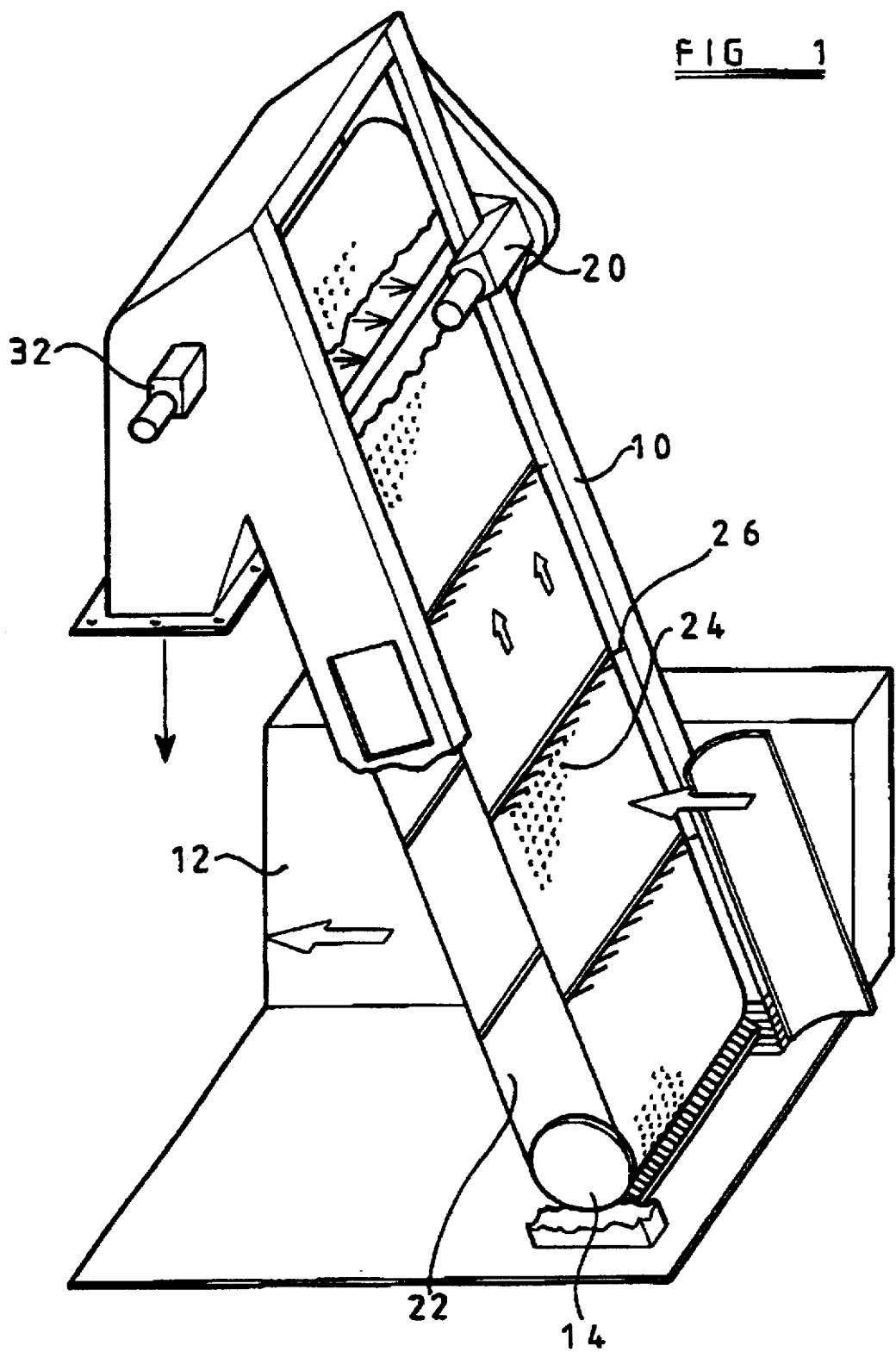
FIG. 1 is a perspective view with part broken away of a screen assembly in accordance with an embodiment of the invention.
Figure 2:
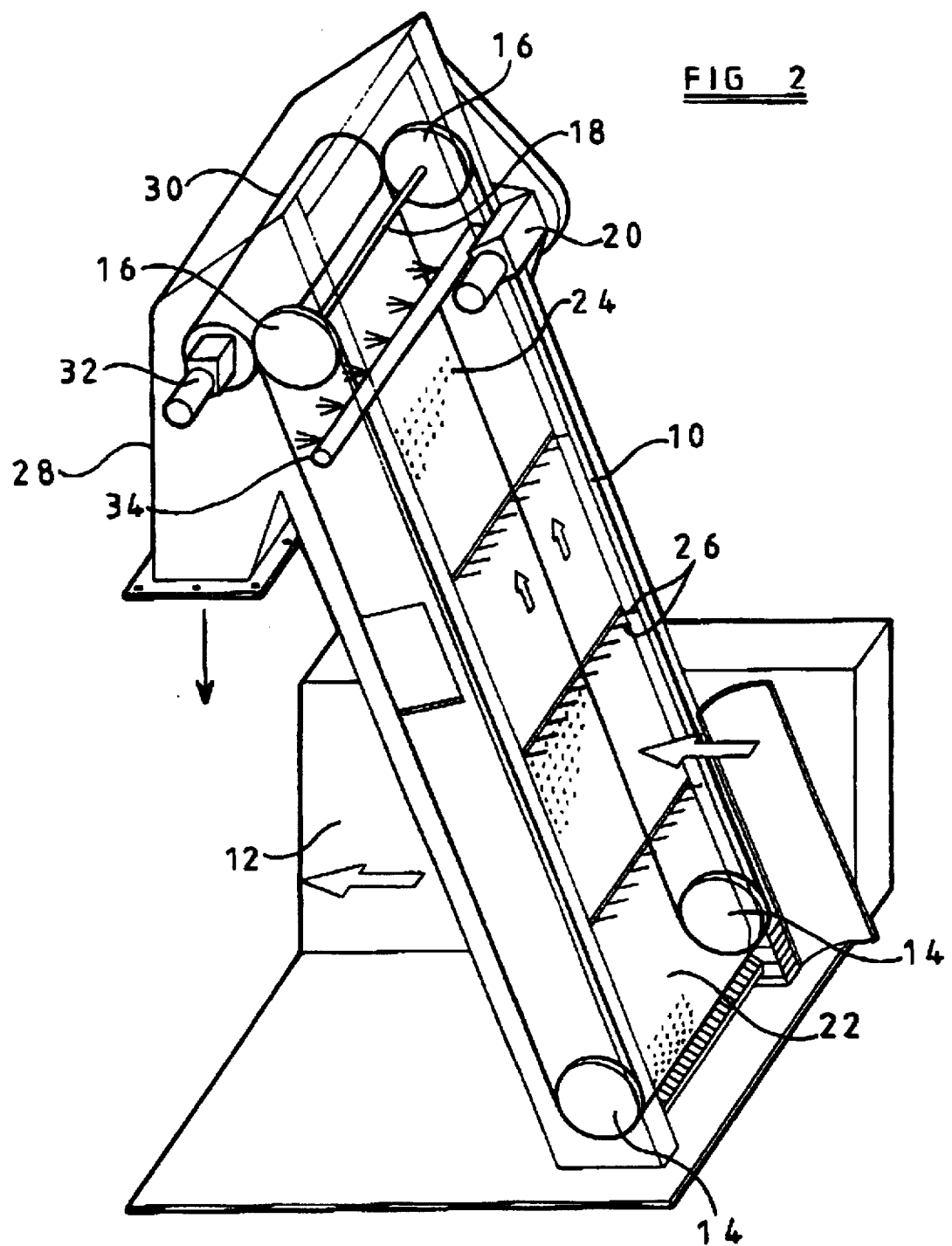
FIG. 2 is a diagrammatic view of the screen assembly of FIG. 1.

The screen assembly illustrated in FIGS. 1 and 2 comprises a rigid support structure 10 arranged to extend across a channel 12 through which raw sewage is arranged to flow in use. First and second coaxial idler rollers or wheels 14 are rotatably mounted on the frame 10 adjacent its lower end. Adjacent the upper end of the frame 10 two further coaxial rollers or wheels 16 are mounted on a common drive shaft 18 which is mounted on the frame and driven by a suitable motor 20 through a gearing mechanism.

A continuous belt 22, in the form of a continuous elongate stainless steel sheet of thickness 0.787 mm the ends of which are interconnected by a hinge extending across the width of the sheet, is entrained around the rollers 14, 16. The width of the belt 22 extends between the two sides of the frame 10, and hence extends across the channel 12 the belt having a multitude of perforations 24 of approximately 6 mm diameter. It will be recognised, therefore, that the diameter of the perforations is greater than the thickness of the belt 22. Since the belt 22 extends across the channel 12, sewage flowing along the channel 12 must pass through the perforations 24 of the belt 22 in order to continue its passage along the channel 12. Since the perforations 24 are of restricted size, solid matter within the flow of sewage of dimensions greater than the dimensions of the perforations 24 will be unable to pass therethrough and so become trapped by the screen. The flow of sewage along the channel 12 results in a pressure gradient across the belt 22 which tends to result in such solids adhering to the belt 22.

It will be recognised that by driving the belt 22 so that the face thereof presented to the flow of unscreened sewage travels in an upward direction, the solids adhering to the belt 22 are lifted clear of the flow of sewage through the channel 12. As shown in the drawings, the belt 22 is provided with a series of spaced forks 26 which are arranged to lift any solids which do not adhere to the belt but which are of dimensions too great to pass through the perforations 24 and to carry such solids out of the flow of sewage along the channel 12.

Adjacent the upper end of the frame 10 and presented to the descending, downstream run of the belt 22, is a collection chute assembly 28 housing an elongate rotatable brush 30 engaging the upper end of the downstream run of the belt across its width. The brush is rotatably driven in a direction to dislodge material from the belt 22 into a collection region of the chute assembly 28, by an electric motor and gearbox or an hydraulic motor arrangement 32. Screenings (the material collected from the flow by the belt 22) are delivered by the chute assembly to a container, to a conveyor, or directly into a further processing apparatus.

The action of the brush against the belt tends to shear matter which adheres to the belt blocking one or more of the perforations, and moreover the thickness of the belt is sufficiently small that the bristles of the brush can extend completely through each perforation thus unblocking the perforations.

A second, polishing brush 31 is also provided, the second brush 31 being downstream of the first brush 30 in the direction of belt movement, and thus arranged to act against the part of the belt 22 already cleaned by the brush 30. The second brush 31 is arranged to be driven in a direction denoted by arrow 33 such that material dislodged from the belt 22 is lift away from the belt 22 and thrown towards chute assembly 28. The second brush 31 is conveniently provided with cleaning means arranged to remove any dislodged material therefrom.

Also as shown in FIG. 2, the screen assembly includes means for washing the belt 22 comprising a sparge pipe 34 extending across the width of the frame 10 between the two runs of the belt 22, the pipe including apertures through which washing water is intended to be sprayed or jetted onto the inner surface of the downstream run of the belt 22 below the brush. 30. The washing water which passes through the perforations 24 in the belt tends to dislodge any screened material which is still adhering to the belt 22 into the chute assembly.

The cleaning arrangement may be supplemented by a weir tray (not shown) which is located above the belt 22 adjacent the brush 30 and is arranged to be supplied with washing water. In use, water overflows from the weir tray across the width of the belt 22 thus moistening any material adhered to the belt 22. Such moistening of the material prior to cleaning by the brush 30 improves the efficiency of the cleaning.

After having been cleaned, continued movement of the belt 22 presents the cleaned portion to the flow of sewage in the channel 12 once more.

It will be recognised that in order to construct a continuous belt 22 of sufficient strength to be suitable for use in the screen, a restricted number of materials are suitable for use in the production of such a belt 22. It has been found that a stainless steel which is extremely strong and can accommodate bends of extremely small radius of curvature, and which has a tensile strength of at least 1240 N/mm$^2$, a hardness of at least RC 40 to 45 (Rockwell Scale), and a thickness within the range of approximately 0.4 mm to 1.0 mm, is suitable. Such material is not particularly susceptible to impact damage, thus is suitable for use in a single stage fine screening installation in which both large and small solids are removed by a single screen.

In order to ensure that the belt does not become misaligned, in use, the rollers 14, 16 are conveniently provided with a lip of enlarged diameter arranged to face the side edges of the belt 22 as the belt 22 passes around the rollers 14, 16. The lip could be continuous, or alternatively could be composed of a plurality of spaced protrusions.

With the belt at its normal operating tension, it has been found that transmission of movement of the belt 22 has not required the use of teeth or the like to engage corresponding recesses in the belt, smooth rollers proving to be sufficient, although the use of drive teeth is not excluded. The provision of smooth rollers or wheels is advantageous in that should the belt become overloaded, for example due to the forks becoming trapped in a heavy object in the flow, the driven rollers 16 can slip relative to the belt so that the risk of damage to the motor 20 by such an overload being reduced. The loading of the belt 22 at which such slipping occurs can be controlled by adjusting the tension of the belt 22, which is conveniently achieved by adjusting the positions of the rollers 14, 16. By monitoring movement of the belt 22 using a suitable sensor, the overload can be detected by sensing no movement or reduced movement of the belt 22 in relation to the driven rollers and suitable signal can thus be generated to operate a warning device. The use of a friction drive arrangement is further advantageous in that there is no requirement to provide relatively large apertures in the belt as would be required if a more positive drive arrangement were used which includes teeth arranged to engage in the apertures.

Figure 3A:
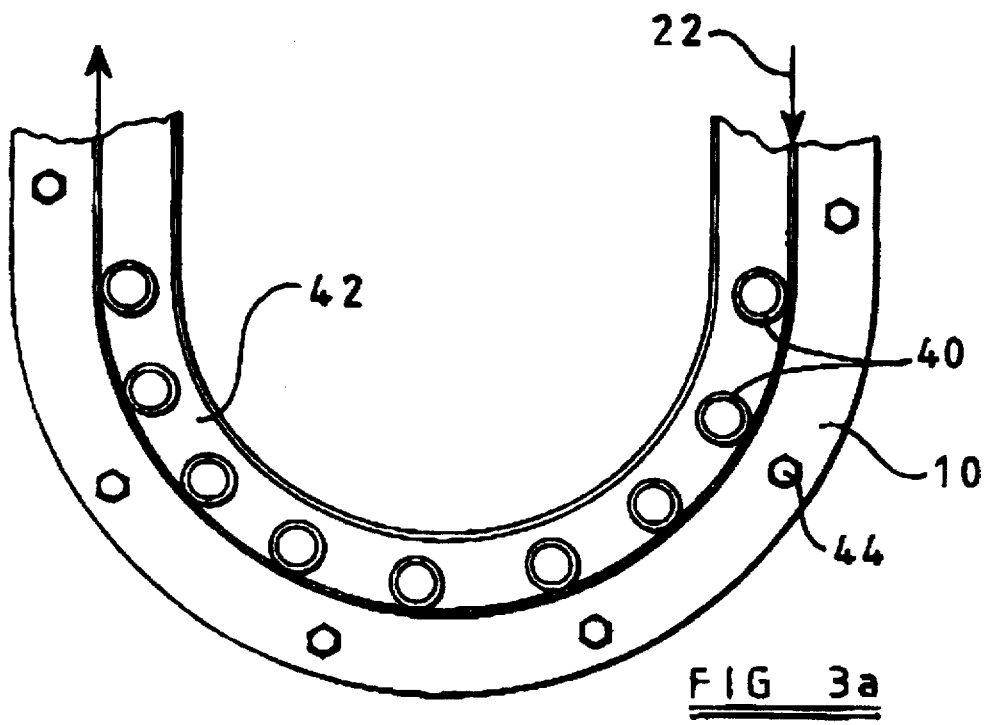
FIGS. 3a and 3b are views of a modified screen assembly.
Figure 3B:
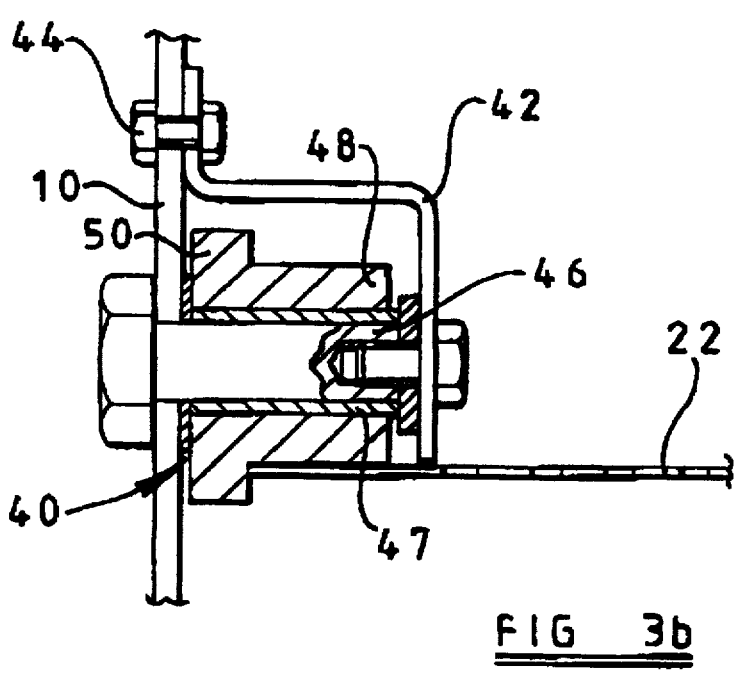

In the modification illustrated in FIGS. 3a and 3b, the lower, idler rollers 14 are each replaced by a plurality of relatively small rollers 40 arranged to define an arc. The rollers 40 are rotatably supported at their ends by, respectively, the lower end of the frame 10 and an arcuate inner frame member 42 which is bolted to the frame 10 by bolts 44, but could alternatively be attached by welding or the like.

As shown in FIG. 3b, each roller 40 comprises a spindle 46 the ends of which are connected to the frame 10 and inner frame 42 using suitable bolts or the like. A roller body 48 is rotatable upon a bearing 47 provided on the spindle 46, the roller body 48 being of substantially cylindrical form, the outer periphery thereof being arranged to engage the belt 22. The end of the roller body 48 closest to the frame 10 is provided with an outwardly extending lip 50 arranged to face an edge of the belt 22 in order to restrict sideways movement of the belt 22, and hence reduce the risk of misalignment of the belt 22.

Figure 4:
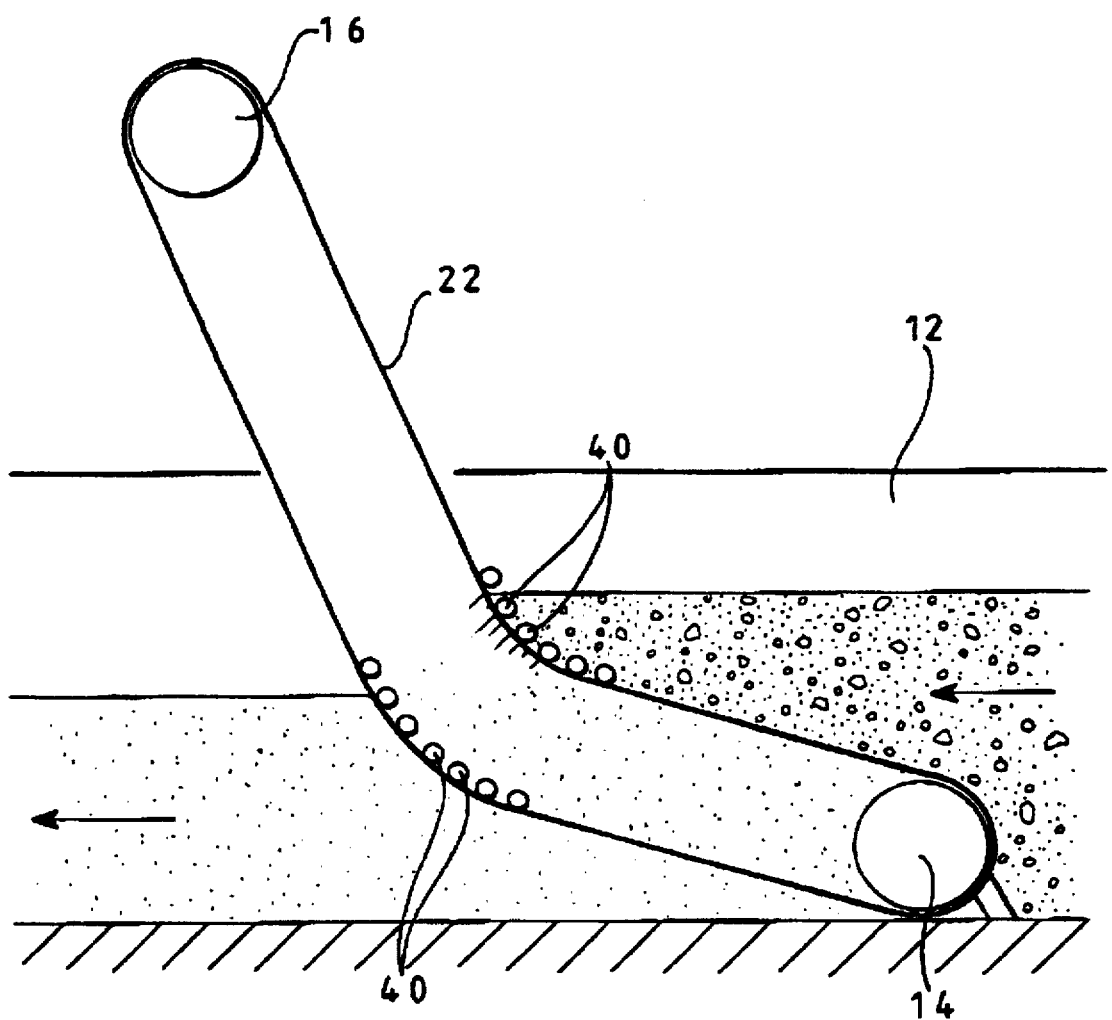
FIG. 4 is a view of a further modification.

The modification illustrated in FIG. 4 includes a pair of sets of rollers 40 between the rollers 16 and idler rollers 14 in order to introduce a bend in the direction of movement of the belt 22 between the rollers 14, 16. Such a bend permits a larger surface area of the belt 22 to be located within the channel 12, and hence increases the capacity of the screen.

Although, as shown, the lower end of the belt 22 is entrained around idler rollers 14, these rollers could be replaced by a plurality of rollers 40 as illustrated in FIGS. 3a and 3b.

The embodiment illustrated in FIGS. 5a and 5b comprises a belt 22 entrained around a pair of driven rollers 16, and a plurality of rollers 40, the axes of the rollers 16, 40 being substantially parallel to the direction of flow along the channel 12. The frame 10 supporting the edge of the belt 22 presented towards the flow is open to permit the flow to enter the region between the two runs of the belt 22. The part of the frame 10 supporting the downstream edge of the belt 22 is closed so that the flow may only continue by passing through the perforations 24 of the belt 22. As shown in FIG. 5b, the channel 12 is provided with guides 52 which direct the flow through the screen as indicated by the arrows, not permitting the flow of sewage to by-pass the screen.

It will be recognised that in this embodiment, the inner face of both runs of the belt 22 is presented to the unscreened flow, thus the brush 30 and sparge 34 or other cleaning means are positioned so as to clean the inner face of the belt 22, a launder 54 being arranged to collect the screenings from the belt 22 and convey them away from the screen.

It will be recognised that in this embodiment both runs of the belt perform a screening action such that the capacity of the screen is increased. The height and width of the screen can be chosen to suit the particular function to be performed, the location and the required capacity.

In the embodiments described hereinbefore, the perforations 24 are of approximately 6 mm diameter. It is envisaged that the perforation diameter could be reduced to, for example, 1 mm for use in circumstances where the screened flow may only include very small solids.

I claim:

1. A screen assembly for sewage treatment comprising a flow channel along which sewage is intended to flow in use, a flexible, perforated elongated metal sheet arranged as a continuous belt entrained around roller or wheel means and projecting into said channel, drive means for driving the belt, the metal sheet having a thickness less than or equal to 1 mm, and a cleaning brush arrangement positioned above the flow in said channel and cooperating with a face of the belt which is presented, in use, to the flow in the channel.

2. A screen assembly as claimed in claim 1, wherein an interconnection of ends of the sheet is flexible.

3. A screen assembly as claimed in claim 2, wherein the interconnection takes the form of a hinge extending across a width of the sheet.

4. A screen assembly as claimed in claim 1, wherein the belt is provided with forks arranged to carry objects with the belt which do not adhere thereto.

5. A screen assembly as claimed in claim 1, further including means for applying washing water to the belt.

6. A screen as claimed in claim 1, wherein the cleaning brush arrangement comprises a rotatable brush.

7. A screen assembly as claimed in claim 6, wherein the cleaning brush arrangement further comprises a second brush.

8. A screen assembly as claimed in claim 1, wherein an axis of rotation of the roller or wheel means is oriented in a direction extending across the channel.

9. A screen assembly as claimed in claim 8, further comprising intermediate roller means arranged to introduce a bend into the direction of movement of the belt, in use.

10. A screen assembly as claimed in claim 1, wherein an axis of rotation of the roller or wheel means is oriented in a direction extending along the channel.

11. A screen assembly as claimed in claim 1, wherein the metal sheet is fabricated of stainless steel.

12. A screen assembly as claimed in claim 1, wherein the drive means comprises a friction drive arrangement.

* * * * *